United States Patent
Park

(10) Patent No.: US 10,158,789 B2
(45) Date of Patent: Dec. 18, 2018

(54) PHOTOGRAPHING SYSTEM AND METHOD FOR SYNCHRONIZING IMAGE QUALITY THEREOF

(71) Applicant: Eun Hong Park, Anyang-Si (KR)

(72) Inventor: Eun Hong Park, Anyang-Si (KR)

(73) Assignee: Eun Hong Park (KR)

( * ) Notice: Subject to any disclaimer, the term of this patent is extended or adjusted under 35 U.S.C. 154(b) by 0 days.

(21) Appl. No.: 15/453,902

(22) Filed: Mar. 8, 2017

(65) Prior Publication Data
US 2017/0272621 A1   Sep. 21, 2017

(30) Foreign Application Priority Data
Mar. 21, 2016   (KR) .................. 10-2016-0033400

(51) Int. Cl.
| H04N 5/06 | (2006.01) |
| G06K 9/62 | (2006.01) |
| G06T 7/00 | (2017.01) |
| H04N 5/232 | (2006.01) |
| H04N 5/247 | (2006.01) |
| H04N 9/73 | (2006.01) |
| H04N 13/243 | (2018.01) |
| H04N 13/296 | (2018.01) |

(52) U.S. Cl.
CPC .............. *H04N 5/06* (2013.01); *G06K 9/6201* (2013.01); *G06T 7/0002* (2013.01); *H04N 5/23206* (2013.01); *H04N 5/23216* (2013.01); *H04N 5/247* (2013.01); *H04N 9/735* (2013.01); *H04N 13/243* (2018.05); *H04N 13/296* (2018.05)

(58) Field of Classification Search
CPC ...... H04N 5/06; H04N 5/23206; H04N 5/247; H04N 5/23216; G06K 9/6201; G06T 7/0002

See application file for complete search history.

(56) References Cited

U.S. PATENT DOCUMENTS

| 8,890,954 B2 * | 11/2014 | O'Donnell | ......... H04N 5/23206 348/143 |
| 9,742,975 B2 * | 8/2017 | O'Donnell | ......... H04N 5/23206 |
| 2005/0174445 A1 * | 8/2005 | Yamashina | ........ H04N 5/23203 348/231.7 |
| 2009/0309973 A1 * | 12/2009 | Kogane | .................. H04N 5/232 348/159 |
| 2015/0097990 A1 * | 4/2015 | Manabe | ............. H04N 5/23245 348/241 |

FOREIGN PATENT DOCUMENTS

| JP | 2003044791 A | 2/2003 |
| JP | 2009017457 A | 1/2009 |
| JP | 2015019118 A | 1/2015 |
| KR | 20080007197 A | 1/2008 |
| KR | 20090102259 A | 9/2009 |

\* cited by examiner

*Primary Examiner* — Gevell Selby
(74) *Attorney, Agent, or Firm* — Renaissance IP Law Group LLP

(57) ABSTRACT

The present disclosure relates to a photographing system and a method for synchronizing image quality thereof, and more particularly, to a photographing system capable of synchronizing image quality between a plurality of cameras by controlling the image quality of a sub camera by transmitting, together with a synchronization signal, an image quality adjustment value generated by the main camera to the sub camera and a method for synchronizing the image quality.

9 Claims, 3 Drawing Sheets

PHOTOGRAPHING SYSTEM AND METHOD FOR SYNCHRONIZING IMAGE QUALITY THEREOF

CROSS-REFERENCE TO RELATED APPLICATION

This application claims priority to Korean Patent Application No. 10-2016-0033400 filed on Mar. 21, 2016 and all the benefits accruing therefrom under 35 U.S.C. § 119, the contents of which are incorporated by reference in their entirety.

BACKGROUND

The present disclosure relates to a photographing system and a method for synchronizing image quality thereof, and more particularly, to a photographing system capable of synchronizing image quality between a plurality of cameras and a method for synchronizing the image quality.

Since a color image sensor outputs Bayer image data, an image signal processor (ISP) block for converting the data into an image recognizable by a human eye is required. In typical cameras, such an ISP block may be embedded in a CMOS image sensor, or an integrated chip (IC) separate from an image sensor chip may be mounted on a printed circuit board (PCB), or may be embedded in an embedded application processor or a central processing unit (CPU). A typical ISP block has a function of brightness calculation, white balance (or color tone) calculation and adjustment, noise reduction, contrast adjustment, color conditioning, or the like. In a typical ISP block, brightness and a white balance are required to be adjusted to be suitable for an image for each image scene (frame) so that natural images may be viewed.

Synchronization of image quality may be more important when using a plurality of cameras, which may be used in a stereo camera, an image composition camera (or image registration camera), etc. A stereo camera processes images simultaneously shot by two unit cameras to calculate a distance in an image. Furthermore, since stereo cameras are recently widely used in distance recognition systems of robots, when a robot calculates a distance by using unsynchronized images, the robot may achieve an image-read distance (or calculated distance) which seriously deviates from an actual distance, and this error may cause damage to the robot or may cause the robot to give physical damage. Therefore, for stereo cameras, not only synchronization signals Hsync and Vsync but also brightness and white balance synchronization between unit cameras is important.

Meanwhile, an image composition camera (or image registration camera) simultaneously shoots images by using a plurality of unit cameras, and composes or registers the images. When composing or registering images having different color tones and brightness, a composed or registered image may be unnatural. Therefore, also in this case, not only the synchronization signals Hsync and Vsync but also the brightness and white balance synchronization between unit cameras is important.

The synchronization signals for unit cameras may be output from a CMOS image sensor, or may be output from an ISP block (or chip). Conventional unit cameras have a function of automatically adjusting the brightness and the white balance of an image by using a CMOS image sensor or an ISP block (or chip), and also have a function of enabling a user to manually adjust the brightness and the white balance, but do not have a function of automatically adjusting the brightness and the white balance through interworking between unit cameras.

Furthermore, according to conventional unit cameras, since a CMOS image sensor or an ISP block (or chip) is only able to output the synchronization signals, the synchronization signals cannot be synchronized between the unit cameras. Therefore, in order to synchronize images, a host processor (or host system) is required to store images output from respective unit cameras and perform image processing by using the stored images.

Moreover, in order to adjust the brightness and the white balance of an image between conventional unit cameras, the host processor (or host system) is required to be set so as to automatically adjust the brightness and the white balance of an image of a main camera and manually adjust the brightness and the white balance of an image of a sub camera. That is, the host processor (or host system) is required to synchronize the brightness and the white balance by reading, each time the synchronization is performed, a brightness setting value and a white balance setting value calculated by the main camera and writing the read values in the sub camera.

SUMMARY

The present disclosure provides a photographing system capable of synchronizing image quality between a plurality of cameras by controlling the image quality of a sub camera by transmitting, together with a synchronization signal, an image quality adjustment value generated by the main camera to the sub camera and a method for synchronizing the image quality.

In accordance with an exemplary embodiment, a photographing system includes: a plurality of cameras including an image sensor unit configured to generate an image signal, a synchronization signal generation unit configured to generate a synchronization signal for obtaining the image signal, and an image processing unit configured to analyze and process the image signal; and a data communication network configured to connect the plurality of cameras to each other, wherein at least one of the plurality of cameras is a main camera, and a rest of the plurality of cameras is a sub camera, wherein the main camera generates an image quality adjustment value and transmits its own synchronization signal and the image quality adjustment value to the sub camera via the data communication network, wherein the sub camera controls an image quality according to the image quality adjustment value transmitted from the main camera.

The image processing unit of the main camera may include an adjustment value generation unit configured to generate the image quality adjustment value by reflecting a difference value between a preset reference image quality value and an image quality value of the main camera obtained by analyzing the image signal of the main camera.

The adjustment value generation unit may generate the image quality adjustment value by further reflecting a difference value between an image quality value of the sub camera and the reference image quality value.

The image processing unit may include an image signal analysis unit configured to obtain an image quality value by calculating a brightness value or a white balance value of the image signal, and calculate a difference value between a preset reference image quality value and the image quality value of the image signal.

The image processing unit may include: an image conversion unit configured to correct the image signal and convert a format of the image signal; and a control unit configured to control the image sensor unit or the image conversion unit according to the image quality adjustment value.

The main camera may transmit, to the sub camera, the image quality adjustment value generated using the image signal of a first frame, and the sub camera may control an image quality of a second frame following the first frame according to the image quality adjustment value generated using the image signal of the first frame.

The synchronization signal generation unit of the sub camera may generate a synchronization signal according to the synchronization signal of the main camera transmitted via the data communication network.

In accordance with another exemplary embodiment, an image quality synchronizing method for a photographing system including a main camera and a sub camera includes: generating a synchronization signal of the main camera; generating an image signal in the main camera according to the synchronization signal of the main camera; analyzing the image signal of the main camera; generating an image quality adjustment value by reflecting a difference between a preset reference image quality value and an image quality value obtained by analyzing the image signal of the main camera; transmitting the synchronization signal of the main camera and the image quality adjustment value to the sub camera; and controlling an image quality of the sub camera using the image quality adjustment value.

The method may further include: generating an image signal in the sub camera; and analyzing the image signal of the sub camera, wherein, during the generating the image quality adjustment value, the image quality adjustment value may be generated by further reflecting a difference between the reference image quality value and an image quality value obtained by analyzing the image signal of the sub camera.

During the generating the image quality adjustment value, the image quality adjustment value may be generated using an image signal of a first frame, and, during the controlling the image quality of the sub camera, an image quality of a second frame following the first frame may be controlled.

The image quality may include a brightness or a white balance of an image, wherein, during the controlling the image quality of the sub camera, the brightness of a raw image obtained from an image sensor unit of the sub camera may be adjusted by controlling the image sensor unit, and the white balance of the image may be corrected by convoluting the raw image and a white balance adjustment value.

The method may further include generating a synchronization signal of the sub camera according to the synchronization signal of the main camera transmitted from the main camera.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
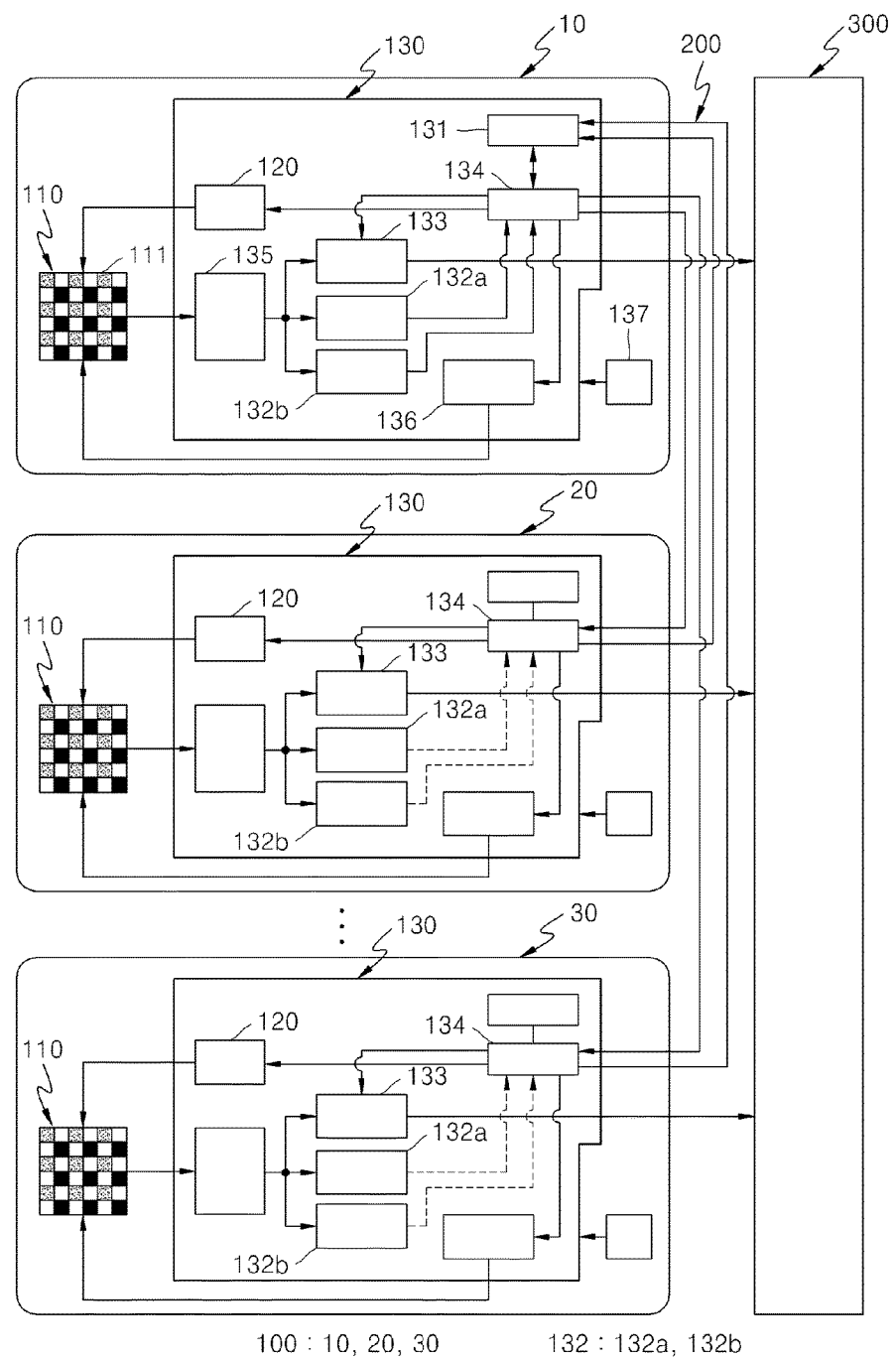
FIG. 1 is a schematic cross-sectional view illustrating a photographing system according to an embodiment.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout FIG. 1 is a schematic cross-sectional view illustrating a photographing system according to an embodiment.

Referring to FIG. 1, the photographing system according to an embodiment may include: a plurality of cameras 100 including an image sensor unit 110 which generates an image signal, a synchronization signal generation unit 120 which generates a synchronization signal for obtaining the image signal, and an image processing unit 130 which analyzes and processes the image signal; and a data communication network 200 which connects the plurality of cameras 100 to each other.

Each of the plurality of cameras 100 may shoot an image, and may include the image sensor unit 110, the synchronization generation unit 120, and the image processing unit 130. Here, the plurality of cameras 100 may be identical.

The image sensor unit 110 may generate an electric image signal by measuring an amount of light incident to the image sensor 111 for each pixel, and may include an image sensor 111 and a register (not shown). The image sensor unit 110 may generate the image signal using an amount of charge converted from light and stored in each pixel of the image sensor 111, and may transfer the generated image signal to the image processing unit 130.

The synchronization signal generation unit 120 may generate the synchronization signal for image synchronization when composing images shot by the plurality of cameras 100. The synchronization signal, which is transmitted together with the image signal to synchronize images when composing the images, may include a horizontal synchronization signal Hsync and a vertical synchronization signal Vsync. The image signal may be obtained according to the synchronization signal generated by the synchronization signal generation unit 120. For example, when the vertical synchronization signal Vsync is started, the amount of the charge stored in the pixels of the image sensor 111 may start to be obtained, and for each horizontal synchronization signal Hsync, pixels of one horizontal line of the image sensor 111 may be scanned.

The synchronization signal generation unit 120 may be provided separately, or may be included in the image sensor unit 110 or the image processing unit 130.

The image processing unit 130 may obtain the image signal according to the synchronization signal and may analyze and process the image signal. The image processing unit 130 may obtain an image quality value by analyzing the image signal, and may compare the image quality value with a reference image quality value to correct an image (or image signal). For example, the image processing unit 130 may be an ISP block or an ISP integrated chip (IC), and may be included in the image sensor unit 110 in the case where the image sensor 111 is a CMOS image sensor. That is, the ISP block or the ISP IC may be embedded in the CMOS image sensor.

The data communication network 200 may connect the plurality of cameras 100 to each other, and may enable transmission/reception of data such as an image quality adjustment value between the plurality of cameras 100. The data communication network 200 may transfer bit data between the plurality of cameras 100, and may transfer, as bit values, image-quality-related data such as the image quality adjustment value. Here, the data communication network 200 may connect the plurality of cameras 100 to each other through serial or parallel communication, or may connect the plurality of cameras 100 to each other through wireless communication.

At least one of the plurality of cameras 100 may be a main camera 10, and the other cameras may be sub cameras 20 and 30. The main camera 10 may generate the image quality adjustment value, and may transmit the image quality adjustment value together with its own synchronization signal to the sub cameras 20 and 30 which are dependent on the main camera 10 via the data communication network 200. Here, the image quality adjustment value may be an adjustment value of an image quality adjustment variable for which each camera 100 is required to be adjusted so as to improve the image qualities of the plurality of cameras 100, and may include a brightness adjustment value for adjusting a brightness value among image quality adjustment variables and a white balance adjustment value for adjusting a white balance value.

Meanwhile, the main camera 10 may be provided in plurality, and a plurality of main cameras 100 may transmit, to the sub cameras 20 and 30, the image quality adjustment values for controlling the image qualities of the sub cameras 20 and 30. Here, the plurality of main cameras 10 may together take charge of all the plurality of cameras 100, or may individually take charge of the plurality of cameras by dividing the plurality of cameras 100.

The sub cameras 20 and 30 may control the image quality according to the image quality adjustment value transmitted from the main camera 10. Accordingly, since both the main camera 10 and the sub cameras 20 and 30 may be controlled in terms of the image quality by using the image quality adjustment value of the main camera 10, the image quality may be synchronized to a desired (or set) image quality between the plurality of cameras 100. Furthermore, the sub cameras 20 and 30 may be provided in plurality, and the number thereof is not particularly limited.

Meanwhile, the main camera 10 may not only transmit the image quality adjustment value to the sub cameras 20 and 30 but also control its own image quality according to its own image quality adjustment value.

Furthermore, according to an embodiment, the brightness of a raw image of a next frame obtained from the image sensor unit 100 may be adjusted by controlling the image sensor unit 100 according to the brightness adjustment value, and the image qualities of the plurality of cameras 100 may be controlled by correcting the white balance of the image by convoluting the raw image and the white balance adjustment value.

The image processing unit 130 of the main camera 10 may include an adjustment value generation unit 131 which generates the image quality adjustment value by reflecting a difference value between the image quality value of the main camera 10 obtained by analyzing the image signal of the main camera 10 and a preset reference image quality value. The adjustment value generation unit 131 may generate the image quality adjustment value for controlling the image qualities of the main camera 10 and the sub cameras 20 and 30. Furthermore, the adjustment value generation unit 131, which may generate the image quality adjustment value by reflecting the difference value between the image quality value of the main camera 10 and the preset reference image quality value, may adjust the image quality values of the main camera 10 and the sub cameras 20 and 30 so that the image quality values approximate to the reference image quality value, and may synchronize the image qualities of the main camera 10 and the sub cameras 20 and 30 so that the image qualities of the main camera 10 and the sub cameras 20 and 30 approximate to the reference image quality.

Here, the image quality adjustment value may be generated by reflecting only the difference value between the image quality value of the main camera 10 and the preset reference image quality value. By reflecting only the difference value between the image quality value of the main camera 10 and the preset reference image quality value when generating the image quality adjustment value, the image quality adjustment value may be generated simply and quickly, and a non-image period (or blank period) between an image period and another image period may be reduced.

In general, since the plurality of cameras 100 are oriented in the same direction or are placed under similar environments, the image qualities of the sub cameras 20 and 30 may be controlled using the image quality adjustment value generated by reflecting only the difference value between the image quality value of the main camera 10 and the preset reference image quality value. That is, when the plurality of cameras 100 are oriented in the same direction or are placed under similar environments, the plurality of cameras 100 may differ from each other in terms of image quality such as brightness or the like depending on locations of the plurality of cameras 100, but the main camera 10 and the sub cameras 20 and 30 undergo the same phenomenon in which an image is generally (or averagely) dark or bright. Accordingly, when it is impossible to identify an image (or distinguish an object) since the image of the main camera 10 is generally too dark, the image qualities (or brightness) of the sub cameras 20 and 30 may be controlled (or adjusted) so that images of the sub cameras 20 and 30 are brightened to have brightness approximating to the reference image quality value, by using the image quality adjustment value (or brightness adjustment value) generated by reflecting only the difference value between the image quality value (brightness value) of the main camera 10 and the reference image quality (or reference brightness value). On the contrary, when it is impossible to identify the image since the image of the main camera 10 is generally too bright, the image qualities of the sub cameras 20 and 30 may be controlled so that the images of the sub cameras 20 and 30 are darkened to have brightness approximating to the reference image quality value, by using the image quality adjustment value.

Meanwhile, the main camera 10 and the sub cameras 20 and 30 have similar brightness, but when the brightness of only one of the main camera 10 and the sub cameras 20 and 30 is adjusted or when one of the main camera 10 and the sub cameras 20 and 30 is increased in brightness and the other is decreased in brightness, a contrast ratio between images may be unbalanced, and thus the contrast of an image may not be properly represented, and a natural image may not be obtained when composing images of the main camera 10 and the sub cameras 20 and 30. Furthermore, when both the main camera 10 and the sub cameras 20 and 30 are adjusted to reference brightness, unique brightness (or contrast) depending on the location (or environment) of the camera 100 may be lost, and thus an image may be unnatural and may be toneless without a contrast ratio (or contrast difference). Furthermore, the white balance may be the same as the brightness, and thus the white balances of the sub cameras 20 and 30 may be adjusted to a white balance approximating to a reference white balance value, by using the white balance adjustment value generated by reflecting only the difference value between the white balance value of the main camera 10 and the reference white balance value.

The adjustment value generation unit 131 may generate the image quality adjustment value by further reflecting the difference value between the image quality values of the sub cameras 20 and 30 and the reference image quality value. When the image quality adjustment value is generated by further reflecting the difference value between the image quality values of the sub cameras 20 and 30 and the reference image quality value, image qualities may be more efficiently synchronized between the plurality of cameras 100. If only the difference value between the image quality value of the main camera 10 and the reference image quality value is reflected when generating the image quality adjustment value, image quality characteristics (e.g., characteristics of a camera itself, a specific environment, or the like) of the sub cameras 20 and 30 are unable to be reflected, and thus a constraint condition is given to image quality synchronization, causing limitation on the image quality synchronization. For example, if the brightness values of the sub cameras 20 and 30 are decreased by five due to problems of the sub cameras 20 and 30, the low brightness values are required to be corrected. However, since the difference value between the image quality values of the sub cameras 20 and 20 and the reference image quality is not reflected, the brightness values caused by the problems of the sub cameras 20 and 30 are unable to be corrected. Furthermore, when the main camera 10 and the sub cameras 20 and 30 are placed under different environments such as a bright place and a dark place, the brightness of the sub cameras 20 and 30 becomes brighter or darker so that a brightness difference between the sub cameras 20 and 30 and the main camera 10 increases in the case where the brightness of the sub cameras 20 and 30 are adjusted by using the image quality adjustment value generated by reflecting only the difference value between the image quality value of the main camera 10 and the reference image quality value.

Therefore, the image quality adjustment value may be generated by further reflecting the difference value between the image quality values of the sub cameras 20 and 30 and the reference image quality value, and image qualities may be more efficiently synchronized by reflecting the image quality characteristics of the sub cameras 20 and 30. Here, the main camera 10 and the sub cameras 20 and 30 may be different from each other with respect to the image quality adjustment value, and in the case where the sub cameras 20 and 30 are provided in plurality, even the sub cameras 20 and 30 may be different from each other with respect to the image quality adjustment value. Here, the adjustment value generation unit 131 may generate the image quality adjustment value for each of the plurality of cameras 100, and the image quality adjustment values may be respectively transferred to the plurality of cameras 100.

The image processing unit 130 may include an image signal analysis unit 132 which obtains the image quality value by calculating the brightness value or the white balance value of the image signal, and calculates the difference value between the preset reference image quality value and the image quality value of the image signal. The image signal analysis unit 132 may obtain the image quality value by calculating the brightness value or the white balance value of the image signal, and may also calculate the difference value between the reference image quality value and the image quality value of the image signal. Here, the image quality value may include the brightness value or the white balance value of the image signal, and the reference image quality value may be set to a desired value or may be set to a calculated optimal value. Furthermore, the reference image quality value may be manually input by a user, or may be calculated and set by the image signal analysis unit 132 of the camera 100. The image quality adjustment value may be generated using the difference value between the reference image quality value and the image quality value of the image signal calculated by the image signal analysis unit 132.

The image signal analysis unit 132 may include a brightness calculation unit 132b which calculates the brightness value of the image signal and calculates the difference value between a preset reference brightness value and the brightness value of the image signal, and a white balance calculation unit 132a which calculates the white balance value of the image signal and calculates the difference value between a preset reference white balance value and the white balance value of the image signal. The brightness calculation unit 132b may calculate the brightness value of the image signal from the image signal obtained by the image processing unit 130, and may also calculate the difference value between the reference brightness value and the brightness value of the image signal. Here, the brightness value of the image signal may be a value obtained by averaging the brightness values of all pixels, and may be calculated by converting a color image (or color image signal) into a black-and-white image (or black-and-white image signal). The brightness adjustment value may be generated using the difference value between the reference brightness value and the brightness value of the image signal calculated by the brightness calculation unit 132b.

The white balance calculation unit 132a may calculate the white balance value of the image signal from the image signal obtained by the image processing unit 130, and may also calculate the difference value between the reference white balance value and the white balance value of the image signal. Here, the white balance value of the image signal may be a value obtained by averaging color density values (or RGB values) for each of three primary colors (red, green, blue) of light, and may be calculated from a color image. The white balance adjustment value may be generated using the difference value between the reference white balance value and the white balance value of the image signal calculated by the white balance calculation unit 132a.

Here, the image signal analysis unit 132 may be provided to both the main camera 10 and the sub cameras 20 and 30, and it may be determined whether to enable the image signal analysis unit 132 of the sub cameras 20 and 30 according to whether to reflect the difference value between the image quality values of the sub cameras 20 and 30 and the reference image quality value when generating the image quality adjustment value.

Furthermore, the image processing unit 130 may include: an image conversion unit 133 which corrects the image signal and converts a format of the image signal; and a control unit 134 which controls the image sensor unit 110 or the image conversion unit 133 according to the image quality adjustment value. The image conversion unit 133 may correct the image signal according to the image quality analyzed by the image signal analysis unit 132, and may convert the image signal into a suitable format. The image conversion unit 133 may directly correct, in a current frame, the image signal according to the image quality analyzed by the image signal analysis unit 132. Here, in an embodiment, instead of directly reflecting, in the image signal, the image quality adjustment value generated according to the image quality, the image quality adjustment value may be reflected in the image signal of a next frame so as to correct the image signal. Furthermore, the image conversion unit 133 may receive, to adjust the white balance value of the image signal, the white balance adjustment value generated as the difference value between the reference white balance value and the white balance value of the image signal calculated by the white balance calculation unit 132a. Here, the image conversion unit 133 may adjust the white balance value of the image signal by proportionally multiplying a color temperature value of the image signal by the white balance adjustment value. That is, the white balance value of the image signal may be adjusted by multiplying the color temperature value of each pixel by a certain value (or the white balance adjustment value) so that the white balance value of the image signal approximates to the reference white balance value.

Meanwhile, the reference white balance value may be determined by standard illumination, which represents an illuminant standardized to illuminate a sample in measuring color of an object. There are three types of illuminants (i.e., illuminant A, illuminant B, illuminant C) of which spectral distributions were determined as standard illumination in the Commission Internationale de l'Eclairage (CIE)'s 1931 conference. Illuminant A, which is light of a bulb, represents black body radiation light of 2,854° K, illuminant B represents noon sunlight, and illuminant C represents average daylight. Furthermore, illuminant E was determined as standard illumination representing light of an equal-energy spectrum, but is not officially adopted by the CIE.

The control unit 134 may control the image sensor unit 110 or the image conversion unit 133 according to the image quality adjustment value. The control unit 134 may generate a control signal according to the brightness adjustment value among the image quality adjustment values so that the image sensor unit 110 is controlled in response to the control signal. Here, the control unit 134 may directly generate the control signal to control the image sensor unit 110, or may generate the control signal using a control signal generation unit 136 connected to the control unit 134. Once the image sensor unit 110 is controlled, the brightness value of an image signal generated by the image sensor unit 110 may be adjusted. Here, the brightness value of the image signal may be adjusted by controlling an exposure time of the image sensor 111. Here, the exposure time of the image sensor 111 may be adjusted using a register (not shown), or may be adjusted by adjusting a shutter speed of the camera 100. Furthermore, the brightness value of the image signal generated by the image sensor unit 110 may be adjusted by adjusting an ISO sensitivity or a degree of opening an aperture of the camera 100.

Meanwhile, a typical CMOS image sensor of the present time includes a register (not shown) related to output of an image. Such a register has a structure so as to be controlled through serial or parallel communication, and the exposure time or the image brightness of the image sensor 111 may be adjusted by controlling the register. Here, the register may be controlled during a communication period, wherein the communication period may correspond to a duration time of several (e.g., six) horizontal synchronization signals Hsync from a start of the vertical synchronization signal Vsync.

Furthermore, the control unit 134 may control the image conversion unit 133 according to the white balance adjustment value among the image quality adjustment values. Here, the control unit 134 may transmit, to the image conversion unit 133, a control signal according to the white balance adjustment value to control the image conversion unit 133, or may directly transmit the white balance adjustment value to the image conversion unit 133 so that the image conversion unit 133 is controlled. Here, the control unit 134 may control the image conversion unit 133 so that instead of the white balance value of the image signal used to generate the white balance adjustment value, the white balance value of the image signal of the next frame is adjusted.

Figure 2:
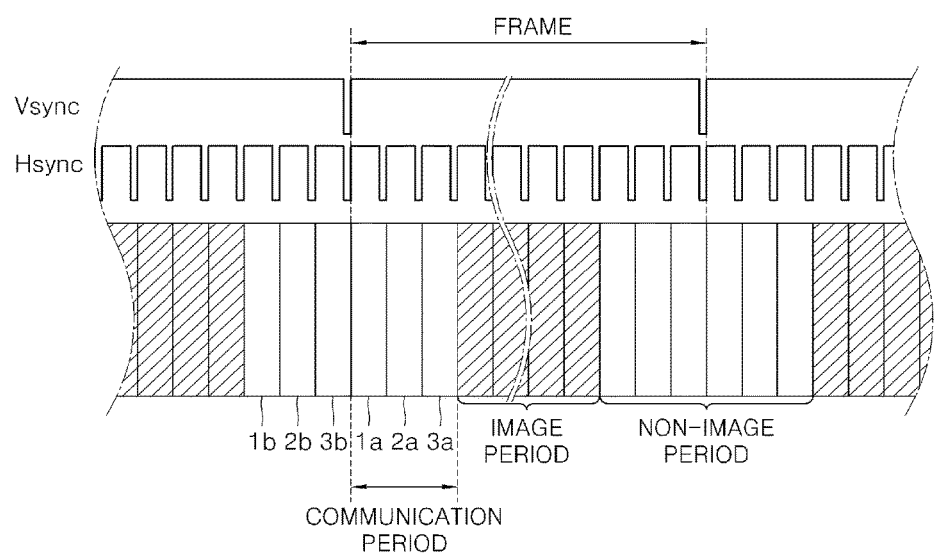
FIG. 2 is a conceptual diagram for describing an execution time of image quality synchronization using a photographing system according to an embodiment.

FIG. 2 is a conceptual diagram for describing an execution time of image quality synchronization using a photographing system according to an embodiment.

Referring to FIG. 2, the main camera 10 may transmit, to the sub cameras 20 and 30, the image quality adjustment value generated using an image signal of a first frame, and the sub cameras 20 and 30 may control the image quality of a second frame following the first frame according to the image quality adjustment value generated using the image signal of the first frame. The image quality adjustment value may be generated using the image signal of the first frame, and may be used to control the image quality of the second frame following the first frame.

In an embodiment, instead of artificially adjusting the brightness of an input image so that the brightness becomes brighter or darker, the brightness of a raw image (or the brightness of an image itself) generated through the image sensor unit 110 is adjusted to be brighter or darker so as to achieve a natural image. Therefore, without adjusting the brightness of the first frame that has been already input, the brightness adjustment value may be applied to the second frame to be input so as to obtain the brightness-adjusted second frame. Furthermore, the image quality of a third frame following the second frame may be controlled according to the image quality adjustment value generated using the image signal of the second frame, and the image qualities of following fourth, fifth, . . . , and nth frames may be controlled according to the image quality adjustment values generated using image signals of immediately previous frames. Accordingly, since the image quality is controlled in real time, the image qualities of the plurality of cameras 100 may be synchronized in real time.

For example, after an image signal is input to the image processing unit 130 in an image period of the first frame (or one frame) in which a normal image is output, the difference value between the reference image quality value and the image quality value of the image signal of the first frame may be calculated in the plurality of cameras 100 during a first horizontal synchronization time 1b in a non-image period (or blank period) of the first frame which follows the image period and in which a blank image is output. Furthermore, during a second horizontal synchronization signal time 2b in the non-image period of the first frame, the difference value between the reference image quality value and the image quality value of the image signal of the first frame of the sub cameras 20 and 30 may be transmitted to the main camera 10 through serial or parallel communication. Moreover, in a non-image period including a third horizontal synchronization signal time 3b of the non-image period of the first frame, the main camera 10 may generate the image quality adjustment value. Next, during a first horizontal synchronization signal time 1a in a non-image period prior to an image period of the second frame (or next frame) in which a new vertical synchronization signal Vsync is started, the image quality adjustment value may be transmitted to the sub cameras 20 and 30 through serial or parallel communication. Here, the image quality adjustment value may be transmitted from the control unit 134 of the main camera 10 to the control units 134 of the sub cameras 20 and 30. Furthermore, during a second horizontal synchronization signal time 2a in the non-image period prior to the image period of the second frame, the image qualities of the plurality of cameras 100 may be controlled according to the image quality adjustment value. Accordingly, the image quality of an image signal (or image) generated in the image period of the second frame may be improved.

As described above, in an embodiment, the sub cameras 20 and 30 may receive the brightness adjustment value from the main camera 10, and may use the brightness adjustment value in a brightness-adjustment-related register (not shown) of a CMOS image sensor during the communication period.

In general, a duration time of one horizontal synchronization signal is 63.5 μs when a CMOS image sensor outputs a National Television System Committee (NTSC) image, or is 44.4 μs when the CMOS image sensor outputs a high definition (HD) image, or is 29.6 μs when the CMOS image sensor outputs a full high definition (FHD) image. Here, the NTSC image follows the stand for color television (TV) broadcasting which was started by the NTSC in 1954 after obtaining approval from the Federal Communications Commission (FCC) in 1953. Since a time taken for the main camera 10 to transmit the image quality adjustment value including the brightness adjustment value and the white balance adjustment value to the sub cameras 20 and 30 is up to approximately 25 μm, image non-synchronization may not occur due to the time taken for transferring the image quality adjustment value between the main camera 10 and the sub cameras 20 and 30.

Therefore, in an embodiment, since the image signal of the first frame is analyzed and the image quality of the second frame is controlled by using the non-image period, the image period (or image acquisition) may not be affected, and an image time difference may not occur between the main camera 10 and the sub cameras 20 and 30.

Meanwhile, the number of the horizontal synchronization signals of the non-image period (or a length of the non-image period) is not particularly limited, and non-image periods leading and following the image period are sufficient for each frame (or vertical synchronization signal). However, in the case of a real-time image, the number of the horizontal synchronization signals of the non-image period is required to be set so as to fall within a period of time in which the non-image period (or a still image or a blank image) is not recognizable by a human eye. On the contrary, a recorded (or stored) image may not be significantly affected by the number of the horizontal synchronization signals of the non-image period since the non-image period may be deleted according to a synchronization signal to output the image.

Furthermore, when the white balance of a frame is adjusted using the white balance adjustment value generated in the same frame, it takes a long time to calculate the white balance adjustment value and correct the white balance, and thus generation of an output image is delayed, and since the brightness adjustment value is reflected in a next frame, the frame in which the white balance adjustment value is reflected differs from the frame in which the brightness adjustment value is reflected, causing an unnatural image. However, in an embodiment, since the white balance of the second frame (or next frame) is adjusted using the white balance adjustment value generated in the first frame, a white-balance-corrected output image may be quickly generated, and a natural image may be obtained since the brightness adjustment value and the white balance adjustment value are applied in the same frame.

The synchronization signal generation unit 120 of the sub cameras 20 and 30 may generate a synchronization signal according to a synchronization signal of the main camera 10 transmitted through the data communication network 200. When the synchronization signal of the main camera 10 is transmitted through the data communication network 200, the synchronization signal generation unit 120 of the sub cameras 20 and 30 may generate a synchronization signal according to the synchronization signal of the main camera 10. When the synchronization signal of the main camera 10 is identical to the synchronization signal of the sub cameras 20 and 30, the synchronization signal generation unit 120 may continue to generate a synchronization signal identical to its own synchronization signal, or when the synchronization signal of the main camera 10 is different from the synchronization signal of the sub cameras 20 and 30, the synchronization signal generation unit 120 may generate a synchronization signal in synchronization with the vertical synchronization signal (or start of a frame) of the synchronization signal of the main camera 10. When the synchronization signal of the sub cameras 20 and 30 is generated, the image sensor unit 110 may obtain an image signal (or image) according to the synchronization signal. For example, the image sensor unit 110 may start to obtain the image signal according to a first horizontal synchronization signal of an image period, and, among the pixels of the image sensor 111, pixels of a first horizontal line may be scanned according to the first horizontal synchronization signal of the image period. The image signal may be obtained by scanning pixels of n number of horizontal lines according to the first to nth horizontal synchronization signals of the image period. Furthermore, the image sensor unit 110 may be controlled to adjust the brightness (or brightness value) in the non-image period prior to the image period of a frame (or vertical synchronization signal).

Accordingly, the synchronization signals of the main camera 10 and the sub cameras 20 and 30 may be synchronized, and when composing images of the main camera 10 and the sub cameras 20 and 30, images of the same time may be composed by synchronizing the synchronization signals. Meanwhile, since the synchronization signals of the main camera 10 and the sub cameras 20 and 30 are synchronized, when the main camera 10 and the sub cameras 20 and 30 output images respectively in real time, the images may be synchronized with each other.

Meanwhile, when the plurality of cameras 100 output image signals, synchronization signals may be combined with the image signals to output the image signals with the synchronization signals being synchronized, so that images of the plurality of cameras 100 may be synchronized. Once image qualities are synchronized between the plurality of cameras 100, a natural composed image may be obtained when the images of the plurality of cameras 100 are synchronized. That is, it is advantageous that brightness, color tone, and the like are matched between the plurality of cameras 100 when the images of the plurality of cameras 100 are synchronized.

The photographing system of an embodiment may further include a host unit 300 which is connected to the plurality of cameras 100 to store images output from the plurality of cameras 100 and assign an identifier to each camera 100. The host unit 300 may store images (or image signals) shot by the plurality of cameras 100 and output therefrom, wherein the output images may be images obtained by analyzing and processing image signals in the image processing unit 130. By combining the images stored in the host unit 300 with synchronization signals with the synchronization signals being synchronized, so that synchronized images may be output to a screen (or monitor).

The host unit 300 may assign the identifier to each camera 100. The host unit 300 may assign the identifier according to whether each camera 100 is the main camera 10 or the sub cameras 20 and 30, and when the main camera 10 receives the difference values between the image quality values of the sub cameras 20 and 30 and the reference image quality value, the host unit 300 may determine, by using the identifier, from which sub camera the difference values have been transmitted, and may transmit, to the sub cameras 20 and 30, image quality adjustment values suitable for the sub cameras 20 and 30 respectively.

Meanwhile, the photographing system of an embodiment may further include a clock generator 137 which generates a clock for allowing the plurality of cameras 200 to operate at a fixed speed, and the image processing unit 130 may further include an image acquisition unit 135 which obtains, according to the synchronization signal, an image signal generated by the image sensor unit 110. The clock generator 137 may generate a clock so that elements of the camera 100, such as the image processing unit 130, may operate at a fixed speed. The clock, which is a specific signal for allowing the elements of the camera 100 to operate at a fixed speed, may be supplied as an electric pulse to the elements of the camera 100 at regular intervals so that the elements of the camera 100 operate in response to the clock. In general, a unit of the clock is set as an interval between one signal and a next signal, and a clock speed is represented by hertz (Hz). The unit "Hz" represents the number of times a signal occurs per second. That is, one operation per second is represented by 1 Hz. For example, 30 MHz represents that digital signals of 0 and 1 are generated 30 million times per second. The synchronization signal generation unit 120 may generate the synchronization signal in response to the clock.

The image acquisition unit 135 may obtain, according to the synchronization signal, an image signal generated by the image sensor unit 110. Here, the image acquisition unit 135 may directly transmit the obtained image signal to the image signal analysis unit 132 or the image conversion unit 133 without converting the obtained image signal, or may convert the obtained image signal to transmit the obtained image signal to the image signal analysis unit 132 or the image conversion unit 133.

Figure 3:
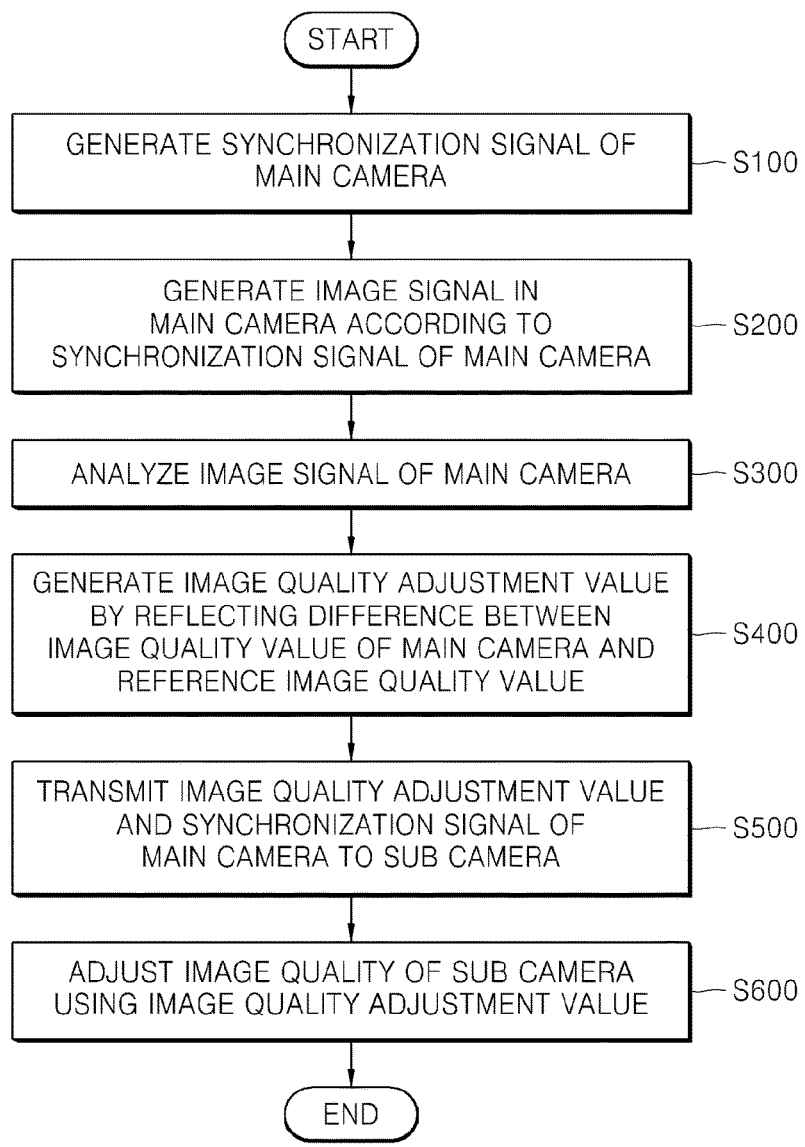
FIG. 3 is a flowchart illustrating an image quality synchronizing method according to another embodiment.

FIG. 3 is a flowchart illustrating an image quality synchronizing method according to another embodiment.

The image quality synchronizing method according to another embodiment is in detail described below with reference to FIG. 3, but descriptions which overlap with the above descriptions of the photographing system according to an embodiment are not provided below.

The image quality synchronizing method for a photographing system including a main camera and a sub camera, according to another embodiment, may include: generating a synchronization signal of the main camera (S100); generating an image signal in the main camera according to the synchronization signal of the main camera (S200); analyzing the image signal of the main camera (S300); generating an image quality adjustment value by reflecting a difference between a preset reference image quality value and an image quality value obtained by analyzing the image signal of the main camera (S400); transmitting the synchronization signal of the main camera and the image quality adjustment value to the sub camera (S500); and controlling an image quality of the sub camera using the image quality adjustment value (S600).

Firstly, the synchronization signal of the main camera is generated (S100). The synchronization signal, which is transmitted together with an image signal to synchronize images when composing the images shot by a plurality of cameras, may include the horizontal synchronization signal Hsync and the vertical synchronization signal Vsync.

The image signal is generated in the main camera according to the synchronization signal of the main camera (S200). This operation may be performed substantially simultaneously with the operation of generating the synchronization signal of the main camera (S100), and in this operation, the image signal may be generated in the main camera according to the synchronization signal of the main camera. Here, for example, when the vertical synchronization signal Vsync is started, the amount of charge stored in a pixel of an image sensor of the main camera may start to be obtained, and pixels of one horizontal line of the image sensor may be scanned for each horizontal synchronization signal Hsync.

The method may further include generating an image signal in the sub camera (S250). This operation of generating the image signal in the sub camera may be performed simultaneously with the operation of generating the image signal in the main camera (S200), and the sub camera may also generate the image signal according to a synchronization signal.

Next, the image signal of the main camera is analyzed (S300). In the operation of analyzing the image signal of the main camera (S300), the image quality value may be obtained by analyzing the image signal generated in the main camera, wherein the brightness value of the image signal or the white balance value of the image signal may be calculated to obtain the image quality value.

The method may further include analyzing the image signal of the sub camera (S350). This operation of analyzing the image signal of the sub camera (S350) may be performed simultaneously with the operation of analyzing the image signal of the main camera (S300), and in this operation, the image quality value may be obtained by analyzing the image signal generated in the sub camera, wherein the brightness value of the image signal or the white balance value of the image signal may be calculated to obtain the image quality value.

The image quality adjustment value is generated by reflecting the difference between the preset reference image quality value and the image quality value obtained by analyzing the image signal of the main camera (S400). In generating the image quality adjustment value by reflecting the difference between the preset reference image quality value and the image quality value obtained by analyzing the image signal of the main camera, the image quality adjustment value may include a brightness adjustment value or a white balance adjustment value. The image qualities of the main camera and the sub camera may be controlled using this image quality adjustment value. By reflecting only the difference between the image quality value of the main camera and the preset reference image quality value when generating the image quality adjustment value, the image quality adjustment value may be generated simply and quickly, and a non-image period (or blank period) between an image period and another image period may be reduced.

In the operation of generating the image quality adjustment value (S400), the image quality adjustment value may be generated by further reflecting the difference between the reference image quality value and the image quality value obtained by analyzing the image signal of the sub camera. When the image quality adjustment value is generated by further reflecting the difference between the image quality value of the sub camera and the reference image quality value, image qualities may be more efficiently synchronized between the plurality of cameras.

The synchronization signal of the main camera and the image quality adjustment value are transmitted to the sub camera (S500). When the image quality adjustment value is generated in the main camera, the image quality adjustment value may be transmitted together with the synchronization signal of the main camera to the sub camera. The sub camera may generate (or re-generate) a synchronization signal according to the synchronization signal of the main camera, and may control the image quality using the image quality adjustment value.

The image quality of the sub camera is controlled using the image quality adjustment value (S600). When the sub camera controls the image quality using the image quality adjustment value, in an embodiment, instead of artificially adjusting the brightness or the white balance of an input image, an image obtained by adjusting (or correcting) the brightness or the white balance of a raw image (or the brightness or the white balance of an image itself) may be generated thereafter (or in a next frame).

The image quality may include the brightness or the white balance of an image. Since whether image identification (or object distinguishing) is possible or impossible is determined according to the brightness of an image, the brightness may be an important factor for the image quality, and, since the white balance may harmonize color tones between images generated in the plurality of cameras, the white balance may be a factor for determining the image quality. Therefore, the image quality value may include the brightness value or the white balance value of an image, and the image quality adjustment value may include the brightness adjustment value or the white balance adjustment value.

Furthermore, in the operation of controlling the image quality of the sub camera (S600), the brightness of the raw image obtained from the image sensor unit may be adjusted by controlling the image sensor unit of the sub camera. The image sensor unit of the sub camera may be controlled, and the brightness of the raw image obtained from the image sensor unit of the sub camera may be adjusted, according to the brightness adjustment value. Once the image sensor unit controlled, the brightness value of the image signal generated in the image sensor unit may be adjusted. Here, the brightness value of the image signal generated in the image sensor unit may be adjusted by controlling the exposure time of the image sensor of the image sensor unit. Here, the exposure time of the image sensor may be adjusted using a register, or may be adjusted by adjusting the shutter speed of the camera. Furthermore, the brightness value of the image signal generated in the image sensor unit may be adjusted by adjusting the ISO sensitivity or the degree of opening an aperture of the camera.

Furthermore, in the operation of controlling the image quality of the sub camera (S600), the white balance of an image may be corrected by convoluting the raw image and the white balance adjustment value. The brightness-adjusted raw image and the white balance adjustment value may be convoluted, and the white balance of an image may be corrected when the raw image and the white balance adjustment value are convoluted. The white balance of an image (or output image) may be corrected by convoluting the color temperature value of each pixel of the raw image and the white balance adjustment value so that the white balance value of the raw image approximates to the reference white balance value. For example, a determinant may be generated using the color temperature value of each pixel to perform a matrix operation on the determinant and the white balance adjustment value. Here, the white balance of an image may be corrected by multiplying the determinant of the color temperature value by a certain ratio.

In the operation of generating the image quality adjustment value (S400), the image quality adjustment value may be generated using an image signal of a first frame, and in the operation of controlling the image quality of the sub camera (S600), the image quality of a second frame following the first frame may be controlled. In an embodiment, instead of artificially adjusting the brightness of an input image so that the brightness becomes brighter or darker, the brightness of the raw image (or the brightness of an image itself) generated through the image sensor unit is adjusted to be brighter or darker so as to achieve a natural image. Therefore, without adjusting the brightness of the first frame that has been already input, the brightness adjustment value generated using the image signal of the first frame may be applied to the second frame to be input so as to obtain the brightness-adjusted second frame. Furthermore, the image quality (or brightness) of a third frame following the second frame may be controlled (or adjusted) according to the image quality adjustment value (or brightness adjustment value) generated using the image signal of the second frame, and the image qualities (or brightness) of following fourth, fifth, . . . , and nth frames may be controlled (or adjusted) according to the image quality adjustment values (or brightness adjustment values) generated using image signals of immediately previous frames. Accordingly, since the image quality is controlled in real time, the image qualities of the plurality of cameras may be synchronized in real time.

The method may further include generating the synchronization signal of the sub camera according to the synchronization signal of the main camera transmitted from the main camera (S550). In generating the synchronization signal of the sub camera according to the synchronization signal of the main camera transmitted from the main camera, the synchronization signal of the sub camera may be generated according to the synchronization signal of the main camera once the synchronization signal of the main camera is received by the sub camera. When the synchronization signal of the main camera is identical to the synchronization signal of the sub camera, the synchronization signal of the sub camera may continue to be generated, or when the synchronization signal of the main camera is different from the synchronization signal of the sub camera, the synchronization signal of the sub camera may be generated in synchronization with the vertical synchronization signal (or start of a frame) of the synchronization signal of the main camera. When the synchronization signal of the sub camera is generated, the image sensor unit of the sub camera may generate an image signal (or image) according to the synchronization signal.

Accordingly, the synchronization signals of the main camera and the sub camera may be synchronized, and when composing images of the main camera and the sub camera, images of the same time may be composed by synchronizing the synchronization signals. Meanwhile, since the synchronization signals of the main camera and the sub camera are synchronized, when the main camera and the sub camera output images in real time, the images may be synchronized with each other.

Meanwhile, the method may further include generating a synchronization signal of the sub camera (S150) prior to the operation of generating the image signal in the sub camera (S250). The operation of generating the synchronization signal of the sub camera (S150) may be performed simultaneously with the operation of generating the synchronization signal of the main camera (S100), and in the operation of generating the image signal in the sub camera (S250), the image signal of the sub camera may be generated according to the synchronization signal of the sub camera. For example, when the vertical synchronization signal Vsync is started, the amount of charge stored in the pixels of the image sensor of the main camera may start to be obtained, and for each horizontal synchronization signal Hsync, pixels of one horizontal line of the image sensor may be scanned.

Furthermore, in the operation of transmitting the synchronization signal of the main camera and the image quality adjustment value to the sub camera (S500), the synchronization signal of the sub camera may be re-generated for each frame according to the synchronization signal of the main camera transmitted from the main camera by virtue of the operation of generating the synchronization signal of the sub camera according to the synchronization signal of the main camera (S550).

As described above, in an embodiment, the image quality of the sub camera is controlled by transmitting, together with the synchronization signal, the image quality adjustment value generated by the main camera to the sub camera, so that image qualities may be synchronized between a plurality of cameras, and, accordingly, for each image scene (or frame), the image quality such as brightness, white balance, or the like may be controlled to be suitable for the image scene, and thus a natural image (or composed image) may be viewed. Furthermore, since the image quality of the sub camera is controlled using the image quality adjustment value generated by the main camera, image qualities may be synchronized with ease and quickly between the plurality of cameras, and the image qualities may be more efficiently synchronized between the plurality of cameras by further reflecting the difference value between the image quality value of the sub camera and the reference image quality value in addition to the difference value between the image quality value of the main camera and the reference image quality value when generating the image quality adjustment value in the main camera. Moreover, in an embodiment, since the synchronization signal of the sub camera may be generated using the synchronization signal transmitted from the main camera, the time difference between the synchronization signals of the plurality of cameras may be reduced, thereby facilitating synchronization of images of the plurality of cameras when composing the images.

Although the photographing system and the method for synchronizing image quality thereof have been described with reference to the specific embodiments, it(they) is(are) not limited thereto. Therefore, it will be readily understood by those skilled in the art that various modifications and changes can be made thereto without departing from the spirit and scope of the present invention defined by the appended claims.

What is claimed is:

1. A photographing system comprising:
    a plurality of cameras comprising an image sensor unit configured to generate an image signal, a synchronization signal generation unit configured to generate a synchronization signal for obtaining the image signal, and an image processing unit configured to analyze and process the image signal; and
    a data communication network configured to connect the plurality of cameras to each other,
    wherein at least one of the plurality of cameras is a main camera, and a rest of the plurality of cameras is a sub camera,
    wherein the main camera generates an image quality adjustment value and transmits its own synchronization signal and the image quality adjustment value to the sub camera via the data communication network,
    wherein the sub camera controls an image quality according to the image quality adjustment value transmitted from the main camera,
    wherein the image processing unit of the main camera comprises an adjustment value generation unit configured to generate the image quality adjustment value by reflecting a difference value between a preset reference image quality value and an image quality value of the main camera obtained by analyzing the image signal of the main camera, and
    wherein the adjustment value generation unit generates the image quality adjustment value by further reflecting a difference value between an image quality value of the sub camera and the reference image quality value.

2. The photographing system of claim 1, wherein the image processing unit comprises an image signal analysis unit configured to obtain an image quality value by calculating a brightness value or a white balance value of the image signal, and calculate a difference value between a preset reference image quality value and the image quality value of the image signal.

3. The photographing system of claim 1, wherein the image processing unit comprises:
    an image conversion unit configured to correct the image signal and convert a format of the image signal; and
    a control unit configured to control the image sensor unit or the image conversion unit according to the image quality adjustment value.

4. The photographing system of claim 1,
    wherein the main camera transmits, to the sub camera, the image quality adjustment value generated using the image signal of a first frame,
    wherein the sub camera controls an image quality of a second frame following the first frame according to the image quality adjustment value generated using the image signal of the first frame.

5. The photographing system of claim 1, wherein the synchronization signal generation unit of the sub camera generates a synchronization signal according to the synchronization signal of the main camera transmitted via the data communication network.

6. An image quality synchronizing method for a photographing system comprising a main camera and a sub camera, the image quality synchronizing method comprising:
    generating a synchronization signal of the main camera;
    generating an image signal in the main camera according to the synchronization signal of the main camera;
    analyzing the image signal of the main camera;
    generating an image quality adjustment value by reflecting a difference between a preset reference image quality value and an image quality value obtained by analyzing the image signal of the main camera;
    transmitting the synchronization signal of the main camera and the image quality adjustment value to the sub camera;
    controlling an image quality of the sub camera using the image quality adjustment value,
    and
    wherein the image quality synchronizing method further comprises:
        generating an image signal in the sub camera;
        analyzing the image signal of the sub camera, and
    wherein, during the generating the image quality adjustment value, the image quality adjustment value is generated by further reflecting a difference between the reference image quality value and an image quality value obtained by analyzing the image signal of the sub camera.

7. The image quality synchronizing method of claim 6, wherein, during the generating the image quality adjustment value, the image quality adjustment value is generated using an image signal of a first frame,
wherein, during the controlling the image quality of the sub camera, an image quality of a second frame following the first frame is controlled.

8. The image quality synchronizing method of claim 6, wherein the image quality comprises a brightness or a white balance of an image,
wherein, during the controlling the image quality of the sub camera, the brightness of a raw image obtained from an image sensor unit of the sub camera is adjusted by controlling the image sensor unit, and the white balance of the image is corrected by convoluting the raw image and a white balance adjustment value.

9. The image quality synchronizing method of claim 6, further comprising generating a synchronization signal of the sub camera according to the synchronization signal of the main camera transmitted from the main camera.

* * * * *